(12) United States Patent
Chidlovskii et al.

(10) Patent No.: US 8,543,906 B2
(45) Date of Patent: Sep. 24, 2013

(54) PROBABILISTIC LEARNING METHOD FOR XML ANNOTATION OF DOCUMENTS

(75) Inventors: Boris Chidlovskii, Meylan (FR); Jérôme Fuselier, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1845 days.

(21) Appl. No.: 11/170,542

(22) Filed: Jun. 29, 2005

(65) Prior Publication Data

US 2007/0022373 A1 Jan. 25, 2007

(51) Int. Cl.
*G06F 17/00* (2006.01)
(52) U.S. Cl.
USPC .......................................................... 715/234
(58) Field of Classification Search
USPC .................. 715/205, 234, 236, 239, 248–249
See application file for complete search history.

(56) References Cited

U.S. PATENT DOCUMENTS

| | | | | |
|---|---|---|---|---|
| 7,475,010 | B2* | 1/2009 | Chao | 715/255 |
| 2004/0103091 | A1* | 5/2004 | Lindblad et al. | 707/3 |
| 2006/0143175 | A1* | 6/2006 | Ukrainczyk et al. | 707/6 |
| 2006/0245654 | A1* | 11/2006 | Viola et al. | 707/102 |

OTHER PUBLICATIONS

'Probabilistic Model of Link Grammar', IBM Technical Disclosure Bulletin, Feb. 1994, vol. No. 37, Issue No. 2B, p. No. 99-106, Feb. 1, 1994.*
Berger et al., "A Maximum Entropy Approach to Natural Language Processing," Computational Linguistics, vol. 22, No. 1, pp. 39-71, 1996.
Chung et al., "Reverse Engineering for Web Data: From Visual to Semantic Structures," IEEE Computer Society, 2002.
Chidlovskii et al., "Supervised Learning for the Legacy Document Conversion," ACM, 2004.
Kuikka et al., "Towards Automating of Document Structure Transformations," ACM, 2002.
Lari et al., "The estimation of stochastic context-free grammars using the Inside-Outside algorithm," Computer Speech and Language, 4, pp. 35-56, 1990.
Frank Neven, "Automata theory for XML researchers," pp. 1-8.
Mukherjee et al., "Structural and Semantic Analysis," 2 pages, May 4, 2005, http://citeseer.ist.psu.edu/668883.html.
Derick Wood, "Standard Generalized Markup Language: Mathematical and Philosophical Issues," The Hong Kong University of Science & Technology, vol. 1000, 1995.
Altamura et al., "Transforming paper documents into XML format with WISDOM++," IJDAR, pp. 4: 1-17. 2001.
Hall, "Language. Modeling Using Efficient Best-First Bottom-Up Parsing," IEEE, pp. 1-6, 2003.
Yannis Papakonstantinou & Victor Vianu, "DTD Inference for Views of XML Data", in *Proc. of 19 ACM Symp. on Principles of Database Systems (PODS)*, Dallas, TX, pp. 35-46 (2000).

(Continued)

*Primary Examiner* — Chau Nguyen
(74) *Attorney, Agent, or Firm* — Fay Sharpe LLP (57) ABSTRACT

A document processor includes a parser that parses a document using a grammar having a set of terminal elements for labeling leaves, a set of non terminal elements for labeling nodes, and a set of transformation rules. The parsing generates a parsed document structure including terminal element labels for fragments of the document and a nodes tree linking the terminal element labels and conforming with the transformation rules. An annotator-annotates the document with structural information based on the parsed document structure.

4 Claims, 4 Drawing Sheets (56) References Cited

OTHER PUBLICATIONS

Chidlovskii et al., "Coupling Maximum Entropy and Probabilistic Context-Free Grammar Models for XML Annotation of Documents," Actes De La Conference Francophone Sur L'Apprentissage Automatique Dans Le Cadre De La Plate-Forme De L' Afia, Nice, France, pp. 1-14, 2005.

Bharati et al., "Approximate Grammar for Information Extraction," International Conference on Universal Knowledge and Language, Goa, India, pp. 1-9, 2002.

* cited by examiner

PROBABILISTIC LEARNING METHOD FOR XML ANNOTATION OF DOCUMENTS

BACKGROUND

Document collections are generated and maintained by businesses, governments, and other organizations. Such document collections are typically accessible via the Internet, a local computer network, or so forth. Documents are created in various diverse formats such as word processing formats, spreadsheet formats, the Adobe portable document format (PDF), hypertext markup language (HTML), and so forth.

Conversion of documents in these diverse formats to a common structured format has certain advantages. PDF and HTML are platform independent formats that enable exchange of documents across computing platforms. However, PDF and HTML are not as effective at facilitating document reuse or repurposing. HTML markup tags, for example, are not very effective at generating complex document organizing tree structures. Moreover, neither PDF nor HTML impose stringent document formatting structure requirements. For example, valid HTML documents can have missing closing tags and other formatting deficiencies.

The extensible markup language (XML) incorporates a document type definition (DTD) section that imposes stringent document formatting requirements. The DTD also supports complex nesting or tree structures. Thus, XML is being recognized as a common document format suitable for document reuse, repurposing, and exchange. Along with XML, other structured formats that include structuring schema or other explicit organization can be used to provide a common structured document format.

Thus, there is a strong motivation to provide robust and flexible conversion tools for converting word processing, spreadsheet, PDF, HTML, and other types of documents to the common XML or other structured format. However, existing conversion tools typically make strong assumptions about source document structure, which limits these conversion tools to a small sub-set of documents.

BRIEF DESCRIPTION

In accordance with some embodiments, a document processor is disclosed. A classifier classifies fragments of an input document respective to a set of terminal elements. A probabilistic grammar defines transformation rules operating on elements selected from the set of terminal elements and a set of non-terminal elements. A parser defines a parsed document structure associating the input document fragments with terminal elements connected by links of non-terminal elements conforming with the probabilistic grammar. The parsed document structure is used to organize the input document.

In accordance with some embodiments, a document processing method is disclosed. Fragments of an input document are classified respective to a set of terminal elements. The classified fragments are parsed to determine a parsed document structure associating the fragments with terminal elements connected by links of non-terminal elements conforming with a probabilistic grammar. The input document is organized as an XML document with an XML structure conforming with the parsed document structure.

In accordance with some embodiments, a document processor is disclosed. A parser parses a document using a grammar having a set of terminal elements for labeling leaves, a set of non-terminal elements for labeling nodes, and a set of transformation rules. The parsing generates a parsed document structure including terminal element labels for fragments of the document and a nodes tree linking the terminal element labels and conforming with the transformation rules. An annotator annotates the document with structural information based on the parsed document structure.

DETAILED DESCRIPTION

Figure 1:
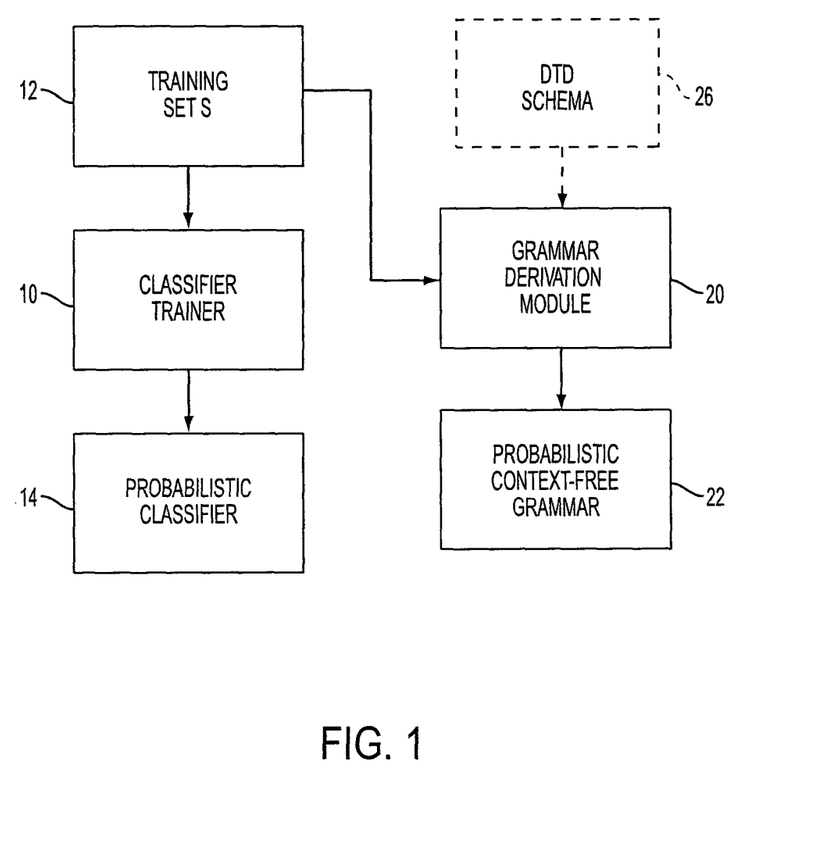
FIG. 1 diagrammatically shows an apparatus for generating a probabilistic classifier and probabilistic context-free grammar suitable for use in organizing or annotating documents being converted to XML.

With reference to FIG. 1, a classifier trainer 10 receives a training set 12 of documents. Each document of the training set 12 is suitably represented as a triplet (x,y,d) where $x=\{x_i\}$ is a sequence of fragments $x_i$ of the training document, $y=\{y_i\}$ is a sequence of terminal elements $y_i$ labeling the fragments $x_i$, and d represents internal nodes of a structural tree. The document fragments $x_i$ are leaves of the training documents, such as paragraphs, footnotes, endnotes, and so forth. In the illustrated examples, the training documents are HTML documents; however, other standardized formats can be used as the input document format.

The document organizing described herein is based upon a close analogy between the document structure (y,d) and grammatical structuring used in natural language parsing. In natural language parsing, a sentence or other natural language expression x can be parsed as (y, d), where italics are used to represent parameters of the analogous situation in natural language processing. The natural language expression $x=\{x_i\}$ is made up of an ordered sequence of words $x_i$, for example making up a sentence in English, French, or another natural language. The parameter $y=\{y_i\}$ represents a sequence of lexical category labels or terminal element labels for the words $x_i$. These terminal element labels may be, for example, nouns, verbs, adjectives, adverbs, and so forth. The parameter d represents a structured parsing of higher level phrasal or non-terminal lexical categories, such as the noun part, verb part, sentence, and so forth.

In an analogous fashion, a document is composed of leaves defined by document fragments such as paragraphs, titles, footnotes, author designations, and so forth. In a structured document, the leaves or fragments are linked together by a structure of higher level nodes according to certain document structuring rules. In the case of XML, the document type definition (DTD) provides the document structuring rules, and is analogous to the grammar of natural language parsing.

Returning to FIG. 1, the classifier trainer 10 suitably trains a probabilistic classifier 14 or other type of classifier to classify the document fragments $x_i$ by appropriate terminal element labels $y_i$. The training set 12 has pre-classified document fragments; that is, each document fragment $x_i$ of the training set 12 is pre-classified by corresponding terminal element label $y_i$. The probabilistic trainer 10 therefore suitably trains the probabilistic classifier to ensure that it substantially accurately classifies the fragments $x_i$ of the training set 12; thereafter, the trained classifier 14 can be used to classify unclassified document fragments.

The illustrated embodiment uses a probabilistic classifier 14. One suitable probabilistic classifier is a maximal entropy-type classifier such as is described in, for example, Berger et al., *A maximum entropy approach to natural language processing*, COMPUTATIONAL LINGUISTICS, 22(1):39-71, 1996. Other probabilistic classifiers can be used, such as a Naïve-Bayes classifier. The probabilistic classifier assigns probability values p(y|x) indicating the probability of terminal element sequence y given an input document fragments sequence x. While a probabilistic classifier is illustrated, a deterministic classifier can also be used. A deterministic classifier outputs a "most probable" classification, rather than a probability distribution. Thus, a deterministic classifier would output a particular terminal element sequence y for a given input fragments sequence x, rather than outputting probabilities p(y|x).

The training set 12 is also processed by a grammar derivation module 20 to derive a probabilistic context-free grammar 22. In the natural language context, a grammar can be represented as a 4-tuple (T,N,Start,R), where T is a set of terminal elements (such as nouns, verbs, adjectives, adverbs, and so forth), N is a set of non-terminal elements (such as the noun part, verb part, sentence, and so forth), Start is a starting point for parsing (such as a capitalized word indicative of the start of a sentence), and R is a set of transformational rules (such as S→NP VP where S represents a sentence, NP represents a noun part, and VP represents a verb part; NP→ART ADJ N where NP represents a noun part, ART represents an article, ADJ represents an adjective, and N represents a noun; and so forth).

The probabilistic context-free grammar of natural language processing is readily analogized to the document type definition (DTD) of XML documents or to the structural schema of other types of structured document formats. The DTD of an XML document defines rules for linking nodes or leaves of the document in a manner highly analogous to the transformation rules of a grammar used for parsing a natural language document. Accordingly, the highly developed automated probabilistic context-free grammar-based parsing techniques developed for natural language processing are applied herein to perform document conversion to XML or another structured document format. The document fragments are labeled by terminal elements in a manner analogous to the labeling of words with parts-of-speech labels in natural language parsing, while higher level linked XML document nodes are constructed in an manner analogous to the parsing of natural language sentences into phrases or higher level parsing constructs.

Thus, the probabilistic context-free grammar 22 for document organizing is suitably represented as a 4-tuple (T,N, Start,R). The set of terminal elements T may include terminal element labels such as "paragraph", "author", "title", "footnote", or so forth, and are used to label fragments $x_i$ of the document. The set of non-terminal elements N are labels for nodes of the structured document, and may include for example, "book", "volume", "chapter", "section", or so forth. The starting point Start can be, for example, "Book", in the case where the documents are electronic books (i.e., "e-books"). The grammar transformation rules R are suitably represented as p:A→α where: A represents a non-terminal element (that is, A belongs to the set N); α={$α_i$} is a sequence of terminal or non-terminal elements (that is, the elements $α_i$ belong to the set T∪N); and p represents a probability that the transform is applicable. The probability p lies between 0 and 1. For a given non-terminal element A, the probability values p for all the rules with that non-terminal element on the left-hand side are typically normalized to sum to unity.

The grammar derivation module 20 can use any technique suitable for deriving a document type definition (DTD) or other document structural schema to derive the probabilistic context-free grammar 22. One suitable approach is described in Papakonstantinou et al., *DTD Inference for Views of XML Data*, In PROC. OF 19 ACM SYMPOSIUM ON PRINCIPLES OF DATABASE SYSTEMS (PODS), Dallas, Tex. (2000), pp. 35-46. Alternatively, if a DTD schema 26 is already available, the grammar derivation module 20 can directly extract the probabilistic context-free grammar 22 from the DTD schema 26.

In some embodiments, the probabilities for the transformation rules are computed from the training set 12 as follows. For a transformation rule A→α, the probability p:→α is suitably computed as:

$$p:A \to \alpha = \frac{\text{count}(A \to \alpha)}{\sum_{A \to \beta \in R} \text{count}(A \to \beta)}, \quad (1)$$

where count (A→α) is the number of occurrences of the transformation rule A→α in the training set 12, while the denominator of Equation (1) is the number of occurrences of any transformation rule in the set of transformation rules R of the probabilistic grammar 22.

Figure 2:
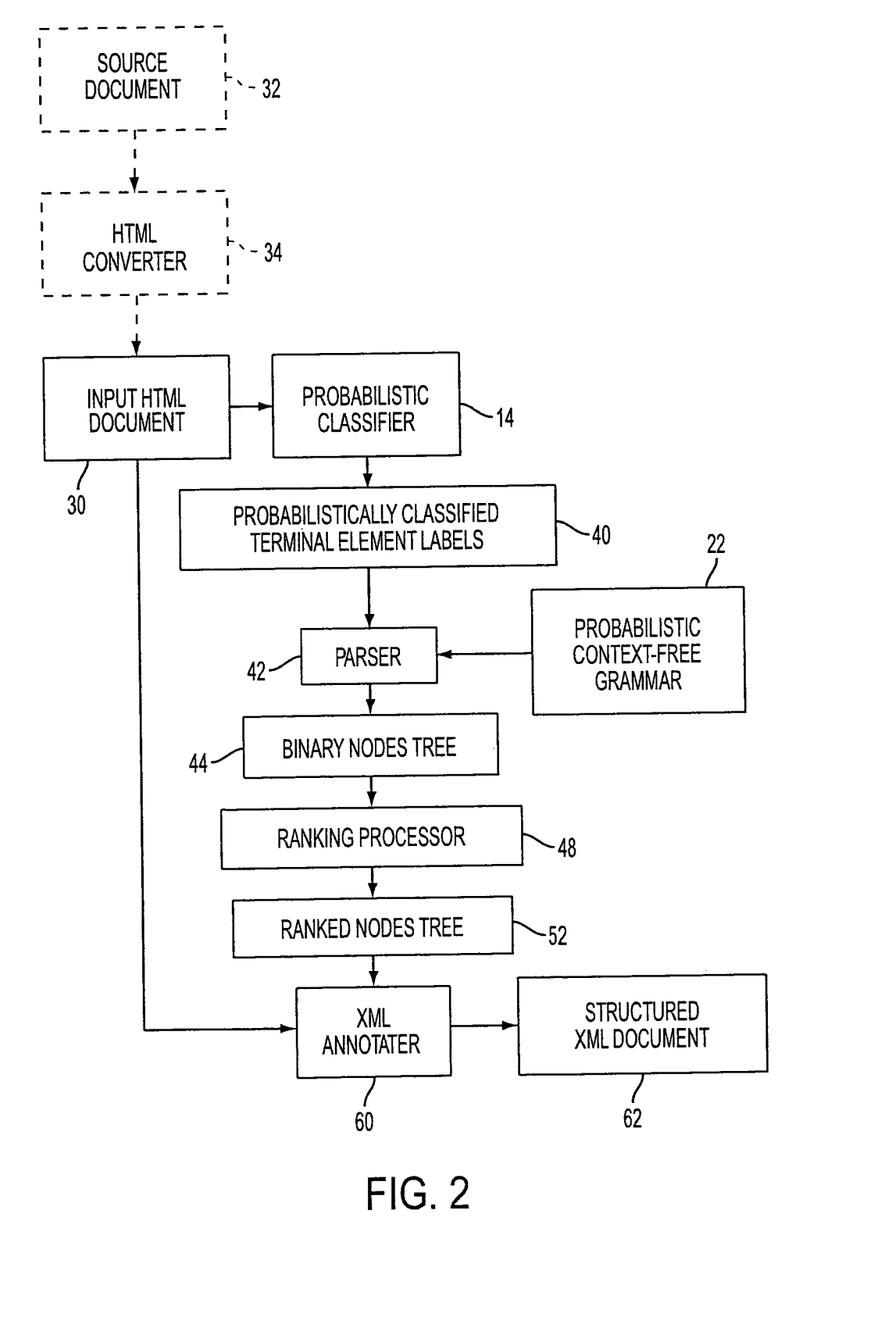
FIG. 2 diagrammatically shows an apparatus for converting a source document into XML. The apparatus employs parsing using the probabilistic classifier and probabilistic context-free grammar generated by the apparatus of FIG. 1 to determine a parsed document structure used to annotate or structure the XML.

With reference to FIG. 2, the probabilistic classifier 14 and the probabilistic context-free grammar 22 are used to organize an input document 30. The input document 30 is formatted in a standardized format such as HTML. The input-document 30 is unstructured or semi-structured, for example, by being divided into fragments or groups of text based on tabulations, white space, identified centered headers, or other document characteristics. If appropriate, a source document 32 is initially converted to the HTML input document format by an HTML converter 34. For example, the source document 32 may be a pdf document, in which case the HTML converter 34 is suitably a commercial pdf-to-HTML converter.

The input document 30 is processed by the probabilistic classifier 14 to assign probability values for the document fragments, thus producing probabilistically classified terminal element labels 40. The probabilistic classifier 14 outputs probability values of the form $p(y_i|x_i)$ for document fragment $x_i$. Alternatively, in some embodiments a deterministic classifier may be used, which outputs a most probable terminal element label $y_i$ corresponding to document fragment $x_i$.

A parser 42 parses the input document 30 based on the probabilistically classified terminal element labels 40. In the illustrated embodiment, the parser 42 employs a Chomsky normal form in which the transformation rules are binary transformation rules of the form A→B C or A→b, where A, B, and C are non-terminal elements belonging to the set of non-terminal elements N, and b is a terminal element belonging to the set of terminal elements T. A non-binary grammar transformation rule of the form A→B C D is suitably represented in the Chomsky normal form as a pair of binary rules A→B P and P→C D, where P is a "placeholder" non-terminal element belonging to the set of non-terminal elements N. Accordingly, parsing in the Chomsky normal form produces a binary nodes tree 44.

Figure 3:
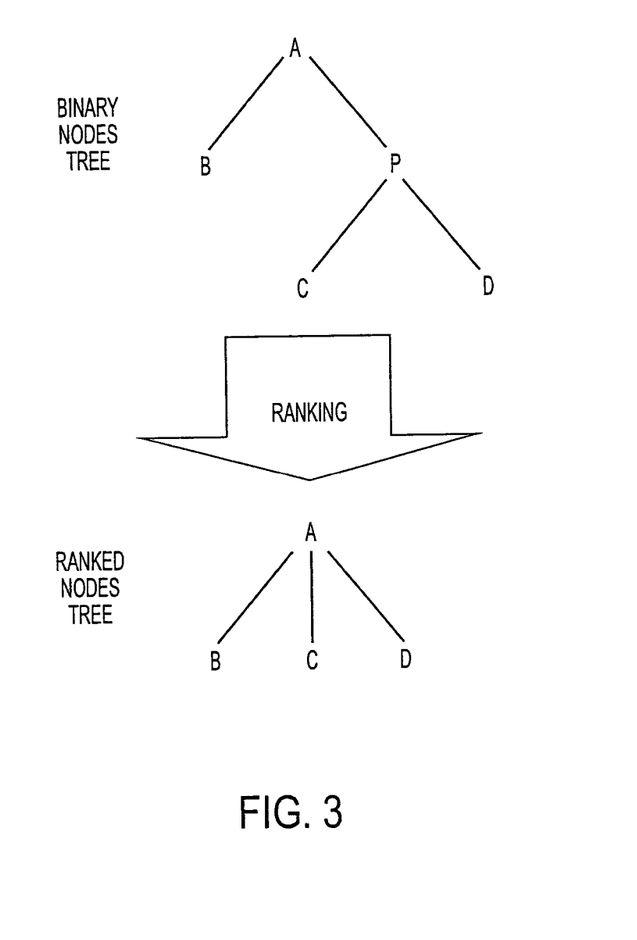
FIG. 3 diagrammatically illustrates ranking of an example binary tree that was constructed using a placeholder non-terminal element "P".

With continuing reference to FIG. 2 and with brief reference to FIG. 3, a ranking processor 48 ranks the nodes of the binary nodes tree 44 by removing the placeholder non-terminal elements P, as illustrated in FIG. 3 for the example of A→B P and P→C D, to produce a ranked nodes tree 52.

With continuing reference to FIG. 2, an XML annotator 60 generates a structured XML document 62 or other structured document having a document structure constructed based on the ranked nodes tree 52 and the probabilistic grammar 22. The structured XML document 62 includes a document type definition (DTD), document schema, or the like derived from the probabilistic grammar 22, and has a parsed document structure corresponding to the ranked nodes tree 52.

Having described the document organizer illustrated with reference to FIGS. 1-3, some examples of document organizing are next provided.

In one approach, the probability p(y|x) for various possible terminal element label sequences y is first maximized to determine the most probable terminal element labels y for the input document 30. The parser 42 then parses the optimized sequence of terminal elements y to determine the nodes tree d, based on probabilities of various transformations given by the probabilistic grammar 22. Optimization of the nodes tree d can be performed, for example, by using the inside/outside optimization set forth in Lari et al., *The estimation of stochastic context-free grammars using the inside-outside algorithm*, COMPUTER SPEECH AND LANGUAGE, 4:35-56, 1990.

However, this sequential approach in which the terminal element labels are first applied, followed by parsing of the tree structure, has been found to have limited robustness. For example, sometimes the most probable terminal element labels sequence may not conform with any parsing achievable using the grammar 22. Improved robustness can be achieved by ranking the best few sequences y, determining the optimized nodes tree d for each of the best sequences, and then selecting the highest joint probability $p(y_r|x) \cdot p(d_r|y_r,G)$ where $p(y_r|x)$ is the probability of the ranked sequence of terminal element labels denoted $y_r$ given fragments sequence x, and $p(d_r|y_r,G)$ is the probability of the nodes tree $d_r$ given the sequence of terminal element labels $y_r$ and the grammar G 22. The latter probability $p(d_r|y_r,G)$ is computed by multiplying together the probabilities of the transformation rules of the probabilistic grammar 22 used to obtain $d_r$ from the sequence of terminal element labels $y_r$.

In another approach, the probability p(y|x) is optimized simultaneously with the probability p(d|y,G). That is, the sequence of terminal elements y and the nodes tree d are optimized simultaneously. In one suitable approach, the joint probability p(d,y|G,x) is optimized, where G represents the grammar 22. Applying Bayes theorem:

$$p(d,y|G,x) = p(d|y,G) \cdot p(y|x) \quad (2),$$

where p(y|x) is the probability of the terminal elements sequence y given fragments sequence x, and p(d|y,G) is the probability of parse d given terminal elements sequence y and the grammar G 22. Maximizing the joint probability given by Equation (2) yields:

$$(y,d)_{max} = \text{argmax}_{(y,d)} \{p(d|y,G) \cdot p(y|x)\} \quad (3).$$

The probabilistic classifier 14 can use various probabilistic classification algorithms to compute the probabilities p(y|x). In some embodiments, a maximum entropy-type probabilistic classification algorithm is used. In this approach, the best model for estimating probability distributions from data is the one that is consistent with certain constraints derived from the training set 12, but which otherwise makes limited assumptions. In the probabilistic framework, this corresponds to selecting a distribution with maximum entropy and closest to a uniform distribution. Each constraint incorporated into the maximum entropy-type probabilistic classifier expresses a selected characteristic of the training set 12 that should also be present in the learned distribution. Each constraint is based on a binary feature, and constrains the expected value of the feature in the model to be equal to its expected value in the training data. Each feature is suitably a binary feature and can depend on the terminal labels sequence y and on selected properties of the input fragments sequence x. For document structuring, content features can be selected that express properties of text contained in document leaves, such as an example feature $f_1(y, x)$ which equals one if the terminal element label y is "title" and x contains only numeric characters, and which equals zero otherwise. The content features can also be selected to characterize the tree context. For example, another example feature $f_2(x, y)$ equals one if the terminal element label y is "author" and the parent of the fragment sequence x is SPAN, and equals zero otherwise.

With the constraints based on the selected features that are functionally dependent upon x and y, the maximum entropy method maximizes the conditional likelihood of p(y|x) which is suitably represented as a log-linear model:

$$p(y|x) = \frac{1}{Z_\alpha(x)} \cdot \exp\left(\sum_\alpha \lambda_\alpha \cdot f_\alpha(x, y)\right), \quad (4)$$

where $\lambda_\alpha$ are scalars corresponding to constraints $f_\alpha(x,y)$ that are optimized by the training of the probabilistic classifier 14, and $Z_\alpha(x)$ is a normalizing factor to ensure that the probabilities sum to unity:

$$Z_\alpha(x) = \sum_y \exp\left(\sum_\alpha \lambda_\alpha \cdot f_\alpha(x, y)\right). \quad (5)$$

The described maximum entropy-based probabilistic classifier is an example. Other probabilistic classifiers can be used, such as naïve-Bayes classifiers.

With returning reference to FIG. 1, a more specific document organizing example is provided. An example document type definition (DTD) 26 is:
    <!ELEMENT Book (author, Section+)>
    <!ELEMENT Section (title, (para|footnote)+)>
    <!ELEMENT author (#PCDATA)>
    <!ELEMENT title (#PCDATA)>
    <!ELEMENT para (#PCDATA)>
    <!ELEMENT footnote (#PCDATA)>
The reduction of the above schema definition to the Chomsky normal form introduces extra non-terminal elements. A suitable corresponding probabilistic grammar 22 derived by the grammar derivation module 20 from this example DTD is G=(T,N, Start, R), where the terminal elements set T={author, title, para, footnote}, the non-terminal elements set N={Book, Author, Sections, Section, Title, Elements, Element} (where "Elements" and "Element" are introduced placeholder non-terminal elements enabling a set of binary transformation rules), Start=Book, and the binary transformation rules R include:
    Book→Author Section|Author Sections
    Sections→Section Section|Section Sections
    Section→Title Elements|Title Element
    Elements→Element Element|Element Elements
    Author→author Title→title
Element→para|footnote For notational distinctiveness, the non-terminal elements of set N are capitalized, while the terminal elements of set T are not capitalized. The grammar derivation module 20 also derives probabilities for the various transformation rules based on their frequency of occurrence in the training set 12, for example by applying Equation (1) to the training set 12, to yield in this example:

Book→Author Section (p=0.3)
Book→Author Sections (p=0.7)
Sections→Section Section (p=0.4)
Sections→Section Sections (p=0.6)
Section→Title Element (p=0.2)
Section→Title Elements (p=0.8)
Elements→Element Element (p=0.4)
Elements→Element Elements (p=0.6)
Author→author (p=1.0)
Title→title (p=1.0)
Element→para (p=0.8)
Element→footnote (p=0.2), where for each transformation rule the parenthetical (p= . . . ) denotes the probability.

Additionally, the classifier trainer 10 trains the probabilistic classifier 14, denoted as classifier C, using the training set 12. For an example document including a sequence of fragments or leaves x={$x_1, x_2, x_3, x_4, x_5$}, the classifier C gives the following terminal element labeling probabilities:

|  | $x_1$ | $x_2$ | $x_3$ | $x_4$ | $x_5$ |
| --- | --- | --- | --- | --- | --- |
| author | 0.3 | 0.2 | 0.1 | 0.1 | 0.2 |
| title | 0.4 | 0.4 | 0.3 | 0.3 | 0.3 |
| para | 0.1 | 0.2 | 0.5 | 0.2 | 0.2 |
| footnote | 0.2 | 0.2 | 0.1 | 0.4 | 0.2 | where for each fragment the highest probability is shown in boldface. Thus, considering only the output of the classifier C, a most probable terminal elements sequence is $y_{max}$={title, title, para, footnote, title} which has a highest probability $p(y_{max})$=0.4×0.4×0.5×0.4×0.3=0.0096. However, this terminal sequence $y_{max}$ derived solely using the classifier C, without reference to the grammar G, has no corresponding parse tree in grammar G.

Figure 4A:
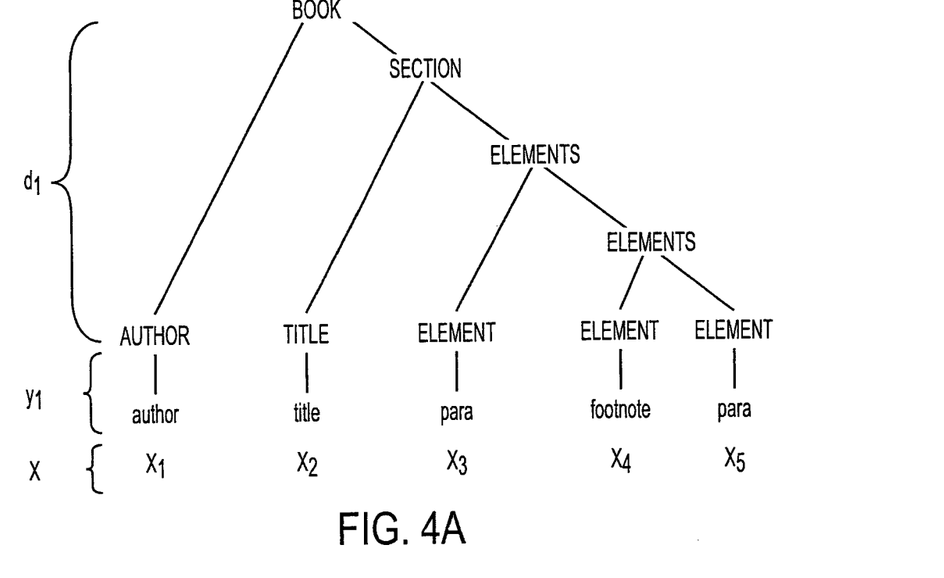
FIGS. 4A and 4B show two valid parsed document structures $(y_1, d_1)$ and $(y_2, d_2)$, respectively, for an example document having a sequence of fragments $x=\{x_1, x_2, x_3, x_4, x_5\}$.
Figure 4B:
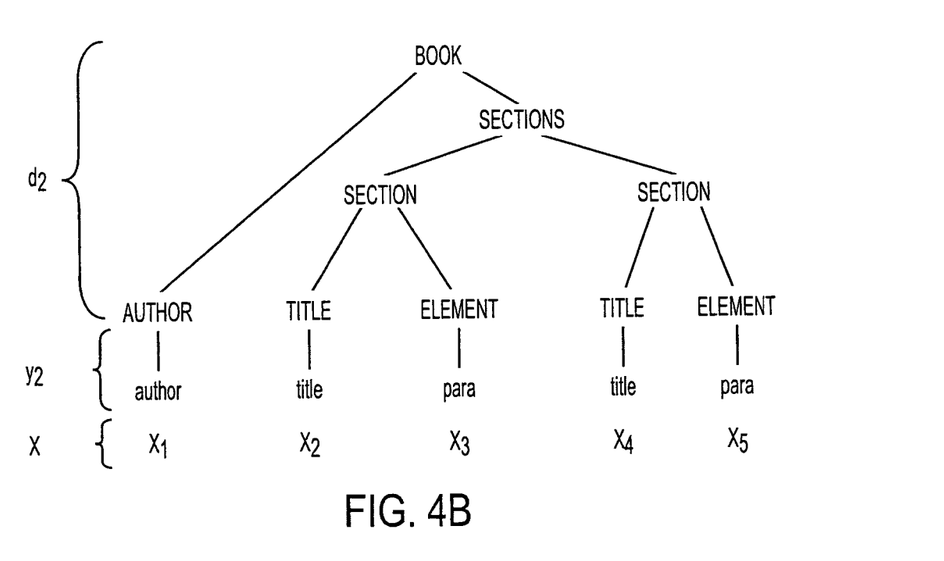

FIGS. 4A and 4B show two valid parsed document structures ($y_1, d_1$) and ($Y_2, d_2$), respectively, for the example document having the sequence of fragments x={$x_1, x_2, x_3, x_4, x_5$}. The parsed document structure ($d_2, y_2$) having the sequence of terminal element labels $y_2$={author, title, para, title, para} and parsed structure $d_2$=Book(Author Sections (Section(Title Element) Section(Title Element))) maximizes the joint probability p(y, d|x,G) of Equation (2). Specifically, $p(y_2|x)$=0.3×0.4×0.5×0.3×0.2=0.0036, while $p(d_2|y_2,G)$ is computed by multiplying together the probabilities of the transformation rules employed in the structure $d_2$. That is, $p(d_2|y_2,G)$=Book→Author Sections(p=0.7)×
Author→author(p=1.0)×Sections→Section Section(p=0.4)×Section→Title Element(p=0.2)×
Title→title(p=1.0)×Element→para(p=0.8)×
Section→Title Element(p=0.2)×Title→title
(p=1.0)×Element→para(p=0.8)=0.007172, giving the joint probability as $p(y_2|x) \times p(d_2|y_2,G)$=0.0036× 0.007172=2.58×10$^{-5}$. By comparison, the joint probability for the parsed document structure ($y_1, d_1$) of FIG. 4A is lower, at about 0.885×10$^{-5}$. Accordingly, the parsed document structure ($y_2, d_2$) of FIG. 4B is selected for the document x.

In some embodiments, the classifier is a deterministic classifier that yields a specific sequence of terminal element labels y for an input sequence of document fragments or leaves x. The parser then determines the most probable parsed document structure d for that sequence of terminal element labels y. In a suitable approach, the inside-outside algorithm is used, which defines two conditional probabilities, conceptually similar to the forward and backward probabilities of the Viterbi algorithm for Hidden Markov models. For a given grammar G=(T,N,Start,R), and a given terminal sequence y, the inside-outside algorithm defines the inside probability as the highest probability partial parse tree spanning a certain substring of y and rooted at a certain non-terminal element A which is an element of the set of non-terminal elements N. The inside probability I(A,i,j) is suitably given by:

$$I(A,i,j)=\max_A p(y_i^j|A_{i,j},G)=\max_A p(A_i^j \Rightarrow {}^+ y_i^j|G) \quad (6),$$

where $y_i^j$ is a random variable ranging over possible terminal subsequences of y beginning with index i and ending with index j, and $A_i^j$ is the event that the non-terminal A is a root of the partial parse tree spanning the terminal subsequence beginning with i and ending with j. The inside probability is calculated recursively, by taking the maximum over all possible ways that the non-terminal A could be expanded in a parse:

$$I(A,i,j)=\max_{q, i \leq q \leq j} p(A \rightarrow BC) \cdot I(b,i,q) \cdot I(C,q+1,j) \quad (7).$$

The recursion is initiated with I(A,k,k)=p(A→$y_k$) and terminates at I(Start, 1, n) which gives the most likely parse for y as:

$$I(S,1,n)=p(y_1^n|\text{Start}_1^n)=p(\text{Start} \Rightarrow {}^+ y_1^n) \quad (8),$$

where n is the length of the observation sequence x and the terminal sequence y.

For the illustrated probabilistic classifier 14 that yields a probability distribution p(y|x) rather than a specific sequence of terminal element labels y, the optimization suitably couples optimization of the y and d. That is, the most likely parsed document structure (y,d) is one that maximizes the joint probability p(y, d|x,G) of Equation (2). In some embodiments, this optimization is performed using a modified inside-outside algorithm extended to find the most probable parsed document structure (y,d). The yd-inside probability is defined as the most probable joint probability of the subsequence of y beginning with index i and ending with index j, and the most probable partial parse tree spanning the subsequence $y_i^j$ and rooted at non-terminal element A:

$$I_{yd}(A,i,j)=\max_{A,y_i^j} p(A_{i,j},G) \cdot p(y_i^j|x)=\max_{A,y_i^j} p$$
$$(A_{ij} \Rightarrow {}^+ y_i^j|G) \cdot p(y_i^j|x) \quad (9).$$

The yd-inside probability is calculated in the recursive manner, by taking the maximum over all possible ways that the non-terminal A could be expanded in a parse:

$$I_{yd}(A,i,j)=\max_{i \leq q \leq j} p(A \rightarrow BC) \cdot p(B \Rightarrow {}^+ y_i^q|G) \cdot p$$
$$(C \Rightarrow {}^+ y_{q+1}^j|G) \cdot p(y_i^j|x) \quad (10).$$

A simplifying independence assumption can be made regarding the probabilities p(y|x), namely, for any q, i≤q≤j, assume $p(y_i^j|x)=p(y_i^q|x) \cdot p(y_{q+1}^j|x)$. Using this simplification, Equation (10) can be rewritten as:

$$I_{id}(A,i,j)=\max_{i \leq q \leq j} p(A \rightarrow BC) \cdot p(B \Rightarrow y_i^q|G) \cdot p($$
$$C \Rightarrow {}^+ y_{q+1}^j) \cdot p(y_i^q|x) \cdot p(y_{q+1}^j) \quad (11),$$

which can be further rewritten as:

$$I_{id}(A,i,j)=\max_{i \leq q \leq j} p(\rightarrow BC) \cdot I_{yd}(B,i,q) \cdot I_{yd}(C,q+1,j) \quad (12).$$

The recursion is terminated at $I_{yd}$(Start,1,n) that gives the most likely parse (d,y)=$\text{argmax}_{(y,d)} p(d,y|G,x)$. That is:

$$I_{yd}(S,1,n)=\max p(\text{Start} \Rightarrow {}^+ y_1^n|G) \cdot p(y_1^n|x) \quad (13).$$

The initialization involves selecting among all terminal elements belonging to the set of terminal elements T being candidates for $y_k$:

$$I_{yd}(A,\cdot,k,k)=\max_{y_k} p(A \rightarrow y_k|G)\cdot p(y_k|x) \quad (14)$$

In one example algorithm for finding the most probable joint parse (y,d), a matrix bestYD[I,A,j] for the best joint probabilities $I_{yd}(A,i,j)$, and a matrix backtrace [i,A,j] of back references enables reconstructing an optimal parse (d, y) for x. Each item in backtrace is a pair (r, k) that indicates that the r-th transformation rule of R is used and the split took place at position k. In the following example algorithm, n is the length of sequence x (note that |x|=|y|); |N| is the number of non-terminals; and $p(y_k|x)$ is the probability of terminal element $y_k$ for document fragment $x_k$. The algorithm is as follows:

```
bestYD[1..n, 1..N, 1..n] := 0; backtrace[1..n, 1..N, 1..n] := null
for k = 1 to n do
  for any rule A → y_k (let r be the rule index) do
    score = p(A → y_k|G) p(y_k|x_k)
    if (score > bestYD[k,A, k]) then
      bestYD[k,A, k] =score; backtrace[k,A, k] := (r, 0)
for l = 2 to n do
  for s = 1 to n - l + 1 do
    for r = 1 to |R| do
      /* let A → BC be the r-th rule in R */
      for k = s to s + l - 2 do
        score=p(A → BC) bestYD[s,B, k] bestYD[k + 1,C, s+l-1]
        if (score > bestYD[s,A, s + l - 1]) then
          bestYD[s,A,s+l-1]=score; backtrace[s,A, s+l-1] = (r, k)
``` bestYD [1, S, n] returns the probability of the most probable parse (y, d)

backtrace[1, S, n] keeps traces of the most probable parse (y, d) for x.

To evaluate the computational complexity of the above example algorithm, the two top-level loops are analyzed. The first for loop sets the optimal values bestYD[k,A,k] by comparing all terminal probabilities for each non-terminal element A in the set of non-terminal elements N. Then the second for loop fills cells in the bestYD matrix in a manner equivalent to the inside-outside algorithm. The total algorithm complexity is therefore $O(n^3 |N|^3+n^2 |T| |N|)$.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A document processor stored in a non-transitory medium comprising:
    a probabilistic classifier that classifies fragments of an input document respective to a set of terminal elements by assigning probability values for the fragments corresponding to elements of the set of terminal elements;
    a parser that defines a parsed document structure associating the input document fragments with terminal elements connected by links of non-terminal elements conforming with a probabilistic grammar defining transformation rules operating on elements selected from the set of terminal elements and a set of non-terminal elements, the parsed document structure being used to organize the input document, the parser including a joint probability optimizer that optimizes the parsed document structure respective to a joint probability of (i) the probability values of the associated terminal elements and (ii) probabilities of the connecting links of non-terminal elements derived from the probabilistic grammar;
    a classifier trainer that trains the probabilistic classifier respective to a set of training documents having pre-classified fragments; and
    a grammar derivation module that derives the probabilistic grammar from the set of training documents, each training document having a pre-assigned parsed document structure associating fragments of the training document with terminal elements connected by links of non-terminal elements.

2. The document processor as set forth in claim 1, wherein the probabilistic grammar is a probabilistic context-free grammar and the joint probability optimizer employs a modified inside/outside optimization.

3. The document processor as set forth in claim 1, wherein the computer is further programmed to implement:
    an XML document converter that converts the input document to an XML document having an XML structure generated in accordance with the parsed document structure.

4. The document processor as set forth in claim 3, wherein the XML document includes a DTD based on the probabilistic grammar.

\* \* \* \* \*